Patented May 30, 1944

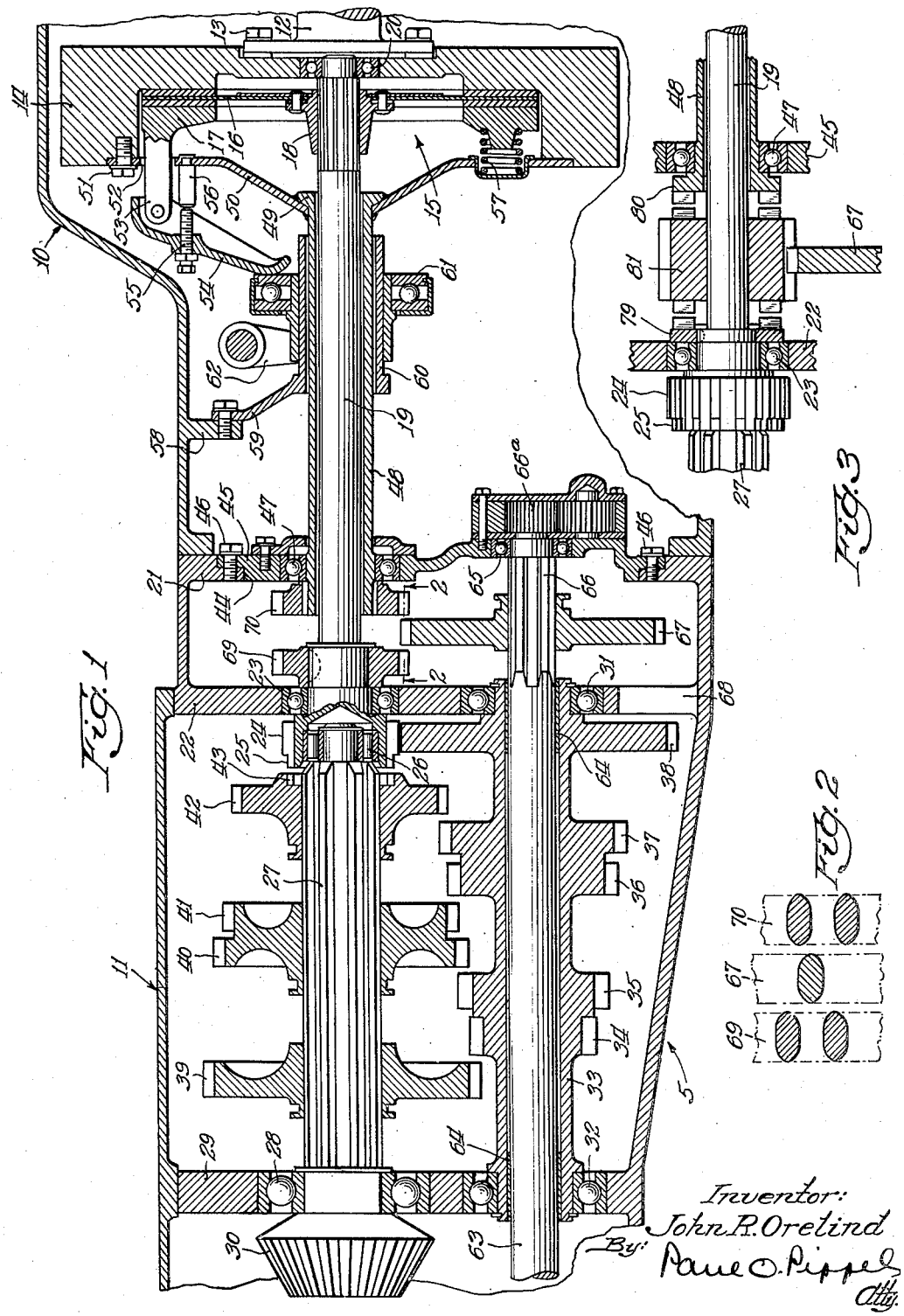

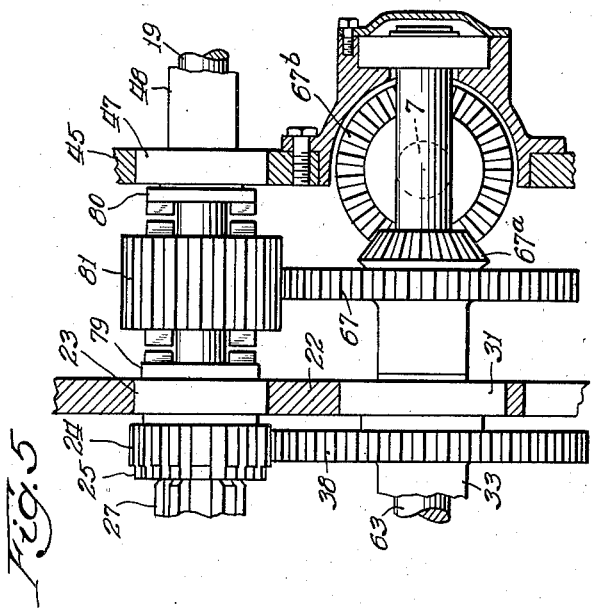

2,349,880

UNITED STATES PATENT OFFICE 2,349,880

POWER TRANSMISSION MEANS

John R. Orelind, Wilmette, Ill., assignor to International Harvester Company, a corporation of New Jersey Application October 8, 1942, Serial No. 461,276

14 Claims. (Cl. 74—11)

This invention relates to a power transmission mechanism and more particularly to a transmission mechanism of the type including a power take-off or auxiliary power shaft.

Various power take-off mechanisms have heretofore been provided that include power take-off or other auxiliary shafts driven by the gearing of the change-speed transmission of a vehicle. Certain of these constructions are characterized by the requirement that the transmission be operated before power can be transmitted by the power take-off shaft. Other mechanisms have heretofore included a power take-off shaft continuously operable by virtue of a direct connection with the vehicle engine or other constantly rotating part. Although structures of this type provide for the continuous operation of the power take-off shaft independently of the change-speed transmission, certain disadvantages are present, such as the requirement that an additional clutch be provided for the power take-off shaft in order that this shaft may be effectively operated in conjunction with accessory implements or vehicles.

The present invention proposes and has for its principal object to provide a continuously operable auxiliary or power take-off shaft having means providing for the operation of said shaft either by or independently of operation of the power shaft that is disengageably connected to the vehicle power source, whereby said shaft may be driven directly by the power source or by said power source through the medium of the disengageable connection or clutch, the latter function enabling the elimination of a separate clutch for the power take-off shaft.

An important object of the invention is to provide a power take-off transmission means that may be easily installed in a vehicle of conventional construction.

Another object of the invention is to connect the improved power take-off means directly to the fly-wheel of a vehicle engine and more specifically to utilize the connecting means as a cooperating part of the vehicle engine clutch.

Another object is to provide a plurality of power take-off shafts or power transfer means arranged to be driven independently of or simultaneously with the vehicle change-speed transmission.

Another object is to provide auxiliary means to be driven by one of the power take-off shafts; such means consisting of, for example, a fluid pump for power lift means that may be used with the vehicle.

Another object is to provide the initial power transmitting shaft of the power take-off shaft as a sleeve surrounding the standard driving shaft of a vehicle drive mechanism and to provide said driving shaft and sleeve with a pair of driving elements associated as parts of a shiftable coupling means enabling driving connection of the power take-off shaft selectively with either the sleeve or the driving shaft.

Other important objects and features of the invention will become apparent as a disclosure is more fully made in the following detailed description and accompanying sheets of drawings, in which:

Figure 1 is a longitudinal sectional view through a vehicle drive means embodying power take-off mechanism constructed according to the present invention;

Figure 2 is an enlarged fragmentary sectional view taken on the line 2—2 of Figure 1 and illustrating a preferred form of gear teeth for use with gears in the coupling mechanism;

Figure 3 is a sectional view of a modified form of coupling means for the power take-off shaft;

Figure 4 is a sectional view of a modified form of construction embodying a second power take-off shaft;

Figure 5 is a similar view showing the structure of Figure 3 modified to embody a second power take-off shaft; and Figure 6 is a diagrammatic plan view of a tractor body showing the locations of the two power take-off shafts.

As stated above, one of the important features of the invention is the provision of a power take-off shaft driving mechanism that is adapted for installation and use in a vehicle drive means of conventional construction. Accordingly, the drawings illustrate such structure, the numeral 5 designating tractor or the like having a rear power take-off shaft 6 and a pulley shaft 7 at one side of the body. The shaft 7 carries a pulley 8 outside the body and inside the body, as will hereinafter more fully appear, carries a bevel pinion 9.

The numeral 10 indicates a fly-wheel housing, formed as part of the body 5, and the numeral 11 indicates a connected housing in which is carried a change-speed transmission, the details of which will be set forth below.

The front end of the housing 10 is open and is connected in any suitable manner to a vehicle engine (not shown), which includes a crank-shaft or driving shaft 12, only the rear portion of which is indicated in the drawings. This shaft is secured by bolts 13 to a fly-wheel 14.

The fly-wheel is associated in the usual manner with a friction clutch, indicated generally at 15, which comprises a driving member or disk 16 adapted to be frictionally engaged with the fly-wheel by means of a pressure plate 17. The driving disk 16 carries a splined hub 18 into which is splined the forward portion of a driving shaft 19. The extreme forward end of the shaft 19 is piloted in the fly-wheel 14 by means of a bearing 20. The construction just described is generally conventional, and the parts may be suitably replaced with other types of standard structures.

The transmission housing 11 is disposed rearwardly of and connected to the front housing 10 and includes a front vertical wall 21 and a rearwardly spaced wall 22. The wall 22 is provided with an opening in which is carried an antifriction bearing 23 for journaling the shaft 19 adjacent its rearward end. This end of the shaft is enlarged and is provided with a driving element in the form of a pair of concentric gears 24 and 25. The enlarged end of the shaft 19 is provided with a bore which carries a bearing 26 for piloting the reduced forward end of a splined output shaft 27. The rear end of this shaft is journaled in an antifriction bearing 28 carried in a vertical wall 29 adjacent the rear end of the transmission housing or casing 11. The shaft 27 extends rearwardly of this wall and has keyed thereto, or otherwise mounted thereon, a driving bevel pinion 30. This pinion may be associated in the usual manner with the final drive mechanism (not shown) of the vehicle.

The walls 22 and 29 are provided respectively with antifriction bearings 31 and 32 disposed axially on a line paralleling the axis of the output shaft 27. These bearings journal a hollow counter-shaft 33. This shaft is provided with a plurality of gears mounted thereon for rotation therewith, these gears being, respectively, a first-speed gear 34, a second-speed gear 35, a third-speed gear 36, a fourth-speed gear 37, and a driving gear 38, the latter being in constant mesh with the gear 24 on the driving or clutch shaft 19. The splined output shaft 27 is provided with a first-speed gear 39, a second-speed gear 40, a third-speed gear 41, and a fourth-speed gear 42. The last-mentioned gear is provided with an internal fifth-speed gear 43 adapted to be meshed with the gear 25 on the shaft 19, this connection providing for direct drive of the output shaft 27. The shiftable gears 39, 40—41, and 42—43 may be shifted by any suitable mechanism, not shown here.

The transmission housing 11, as previously stated, is provided with the transverse vertical wall 21. This wall includes an opening 44 normally closed by a supporting plate 45 rigidly secured to the wall 21 by a plurality of bolts 46. The upper portion of the wall 45 is provided with an antifriction bearing 47 surrounding but not supporting the driving shaft 19. This bearing journals a longitudinal shaft in the form of a sleeve 48, which surrounds the driving shaft 19 and which extends in proximity to the rear face of the fly-wheel 14. The forward end of the sleeve 48 is provided with an annular flange 49, which is rigidly secured as by welding to a hub or plate member 50, which is in turn rigidly connected by a plurality of bolts 51 to the rear face of the fly-wheel. It will thus be seen that the sleeve 48 is driven directly by the fly-wheel 14 and will rotate as long as the fly-wheel is driven by the engine.

The preferred form of the invention illustrated utilizes the hub or plate 50 as the housing or cover plate of the engine clutch 15, and, as a matter of fact, the part 50 may replace the standard plate of such conventional clutches. Accordingly, the plate 50 is adapted to be associated with the operating mechanism for the clutch 15, and to this end is provided with a plurality of openings, only one of which is shown at 52. The pressure plate 17 is provided with a plurality of lugs, only one of which is shown at 53, which extend respectively through the openings 52. Each lug has pivoted thereon an operating arm 54 engageable by means of an adjustable screw 55 with a stud 56 rigidly carried by the plate 50. The pressure plate 17 is engaged by a plurality of pressure springs, only one of which is shown at 57, arranged in circumferentially spaced relation about the radial face of the plate 50.

The upper wall of the housing 10 is provided with a depending bracket portion 58, which carries a support 59 including a sleeve 60 circling or surrounding the sleeve 48 and the driving shaft 19. The sleeve 60 carries slidably thereon a throw-out collar assembly 61 operable by a throw-out yoke 62 and operatively associated with the operating arms 54 of the clutch 15. The actuating mechanism for the clutch operates in the conventional manner, the pressure springs 57 maintaining engagement of the clutch and forward movement of the throw-out assembly 61 pivoting the arms 54 to release the pressure plate 17 and thus to disengage the driving connection between the fly-wheel 14 and the driving disk 16.

As previously stated, the counter-shaft 33 of the change-speed transmission is hollow. A power shaft 63 extends through the counter-shaft 33 and is supported intermediate its ends by the counter-shaft in bushings 64. The rear end of the shaft 63 is suitably connected to the power take-off shaft 6, previously described. The extreme forward end of the shaft 63 is journaled in an antifriction bearing 65 carried in the supporting plate 45 of the transmission housing. The end of the shaft between the bearing 65 and the wall 22 of the transmission housing is splined, as at 66, and carries axially slidable thereon and rotatable therewith a driving gear 67. It will be noted that the wall 22 and the wall 21, including its supporting plate 45, form a compartment adjacent the main compartment of the transmission housing 11. These two compartments are adapted to contain lubricant for the drive gearing. The lower portion of the wall 22 is open, as at 68, to provide for the passage of lubricant between these two compartments. However, the compartment that houses the engine clutch 15 is necessarily a dry compartment and accordingly is appropriately separated by the wall 21 and supporting plate 45 from the lubricant-containing compartments of the transmission. Figure 1 illustrates one form of the invention wherein a gear pump 66a, for example, is driven by the shaft 63. This pump may be used to drive a fluid-pressure device of any type, as will be obvious to those skilled in the art.

Figure 4 shows another form of the invention in which the shaft 63 carries a bevel pinion 66b to drive the bevel pinion 9 of the pulley shaft 7.

In order that the shaft 63 and power take-off shaft 6 may be driven selectively from either the driving shaft 19 or the sleeve 48, there is provided a driving and coupling means optionally connectable between these elements. In one form of the invention, this means includes a driving element in the form of a gear 69 keyed to the driving shaft 19 just forwardly of the antifriction bearing 23 in the wall 22. A second driving element in the form of a gear 70 is keyed to the rear end of the sleeve 48 just rearwardly of the antifriction bearing 47 in the supporting wall 45 in the transverse wall 21 of the housing. This coupling means also includes the shiftable gear 67 on the splined portion 66 of the power take-off shaft. As best shown in Figure 2, the gear teeth on the gears 67, 69, and 70 are preferably relieved at their leading or engaging faces so that shifting and engagement of the gear 67 to either of the gears 69 or 70 may be easily and speedily effected. The gear 67 may be shifted on the shaft 63 by any suitable mechanism.

In a modified form of the invention (Figure 3), the gears 69 and 70 are replaced with clutch members 79 and 80. The member 79 is keyed to the driving shaft 19 in place of the gear 69. The member 80 is keyed to or formed as a part of the sleeve 48 in place of the gear 70. A shiftable gear-clutch element 81 is carried on the shaft 19 for rotation with respect to the shaft. The gear portion of this element is in constant mesh with the teeth on the gear 67 and may be shifted axially on the shaft 19 into engagement with either of the clutch elements or members 79 and 80, these parts having appropriate engaging portions to enable the establishment of a positive driving connection therebetween.

In another form of the invention shown in Figure 7, the gear 67 carries a bevel pinion 67a meshing with a bevel pinion 67b to drive the pulley shaft 7.

In the operation of the structure shown in Figures 1 and 2, power is initiated by the vehicle engine or other power source and the crank shaft 12 and fly-wheel 14 are rotated. Because of the connecting means in the form of the plate 50 between the fly-wheel 14 and sleeve 48, the gear 70 will be constantly rotated. The friction clutch 15 may be optionally engaged or disengaged to control the operation of the driving shaft 19, as when gear changes or the like are required to be made in the change-speed transmission. According to one of the objects of the invention, the engine clutch 15 may be utilized also for controlling the operation of the shaft 63 and power take-off shaft 6. Such control is important in the establishment of power drive between the vehicle and a connected implement or auxiliary vehicle. In the case of harvesting machinery, there are several moving parts to be operated, and it is accordingly convenient to provide for a gradual starting up of these parts through the medium of the power take-off shaft. In such instance the gear 67 may be shifted into engagement with the gear 69 on the driving shaft 19. Now, with the change-speed gearing out of mesh, the engine clutch 15 may be engaged so that drive is established through the shaft 19 and gears 69 and 67 to the power shaft 63.

After the attached implement, in the present example a harvesting machine, has been started, it is desirable to maintain a constant rate of speed of the parts so driven. Inasmuch as the operation of the tractor requires disengagement of the engine clutch for the effecting of speed changes in the transmission, it will be obvious that the speed of the power take-off shaft 6 would be intermittently changed if the shaft 63 were connected to the transmission. According to the present invention, however, this disadvantage experienced in prior constructions is obviated by the provision of the mechanism enabling the connection of the power shaft 63 directly to the fly-wheel 14. This connection is made by a shifting of the gear 67 out of engagement with the gear 69 on the shaft 19 and into engagement with the gear 70 on the sleeve 48. Now, since the shaft 63 is driven continuously by the fly-wheel 14, actuation of the engine clutch 15 will have no affect on its speed of rotation, and accordingly the vehicle embodying the driving means may be stopped or started or the rate of travel thereof varied.

As stated previously, the teeth on the gears 67, 69, and 70 are shaped to provide for easy and speedy engagement of the gear 67 with either of the gears 69 or 70. It will be understood, of course, that the coupling mechanism, here comprising the gears 67, 69, and 70, may be replaced by any suitable form of synchronizing-clutch unit, but, for the purposes of a simple and inexpensive construction, the elements illustrated will suffice.

The operation of the modified form of coupling means (Figure 3) is not materially different from the operation of the means just described. The shiftable member 81 is shiftable axially on the shaft 19 into engagement with either of the clutch members 79 or 80, a function corresponding to the shifting of the gear 67 in Figure 1 into engagement with either of the gears 69 or 70. In Figure 3, the gear-clutch member 81 is in constant mesh with the gear 67 on the shaft 63, and it is accordingly not necessary that the gear be splined on the shaft 63, as illustrated in Figure 1.

It will be apparent from the foregoing description that those objects hereinbefore enumerated are achieved in a preferred form of the invention that is characterized by efficient operation and simple and inexpensive construction. One of the important features of the invention is the disposition of the driving sleeve 48 with respect to the shaft 19 and the engine clutch 15. Another important object is the arrangement of the power shaft 63 and its extension through the hollow counter-shaft 33. It will be understood, of course, that the parts and the disposition thereof may be altered to suit particular instances without a departure from the important principle of the invention, which consists of the provision of means for establishing an alternate drive to the power take-off, and/or belt pulley, between either the ordinary driving shaft, such as the shaft 19, or the continuous source of power, such as the fly-wheel 14 and the crank-shaft 12. Moreover, certain features of the various forms of the invention may be interchanged for the accomplishing of certain desired ends. Other modifications and alterations may be made in the preferred forms of the invention illustrated without departing from the spirit and scope of the invention, as defined in the appended claims.

What is claimed is:

1. For a vehicle including: a fly-wheel; an engine clutch having a driven clutch part; a change-speed transmission; and a driving shaft connecting the transmission and the aforesaid clutch part; a sleeve surrounding the aforesaid driving shaft; means directly connecting said sleeve to the fly-wheel, for rotation of said sleeve regardless of operation of the engine clutch; a gear on the driving shaft; a gear on the sleeve closely spaced from the first gear; a power take-off shaft; and a gear slidably keyed on the power take-off shaft for shifting into mesh with either of the aforesaid gears.

2. For a vehicle including: a fly-wheel; an engine clutch having a driven clutch part; a change-speed transmission; and a driving shaft connecting the transmission and the aforesaid clutch part; a sleeve surrounding the aforesaid driving shaft; means directly connecting said sleeve to the fly-wheel, for rotation of said sleeve regardless of operation of the engine clutch; a clutch member on the driving shaft; a second clutch member on the sleeve spaced from the first clutch member; a power take-off shaft, including a gear; a gear in constant mesh with the power take-off shaft gear and mounted for shifting axially of the axis of the sleeve and driving shaft, and including clutch elements selectively engageable with either of the clutch members on the driving shaft or sleeve.

3. For a vehicle including: a fly-wheel; an engine clutch having a driven clutch part; a change-speed transmission; and a driving shaft connecting the transmission and the aforesaid clutch part; a sleeve surrounding the aforesaid driving shaft; a bracket member secured to the sleeve and rigidly connected to the fly-wheel for rotating the sleeve by the fly-wheel, said bracket having an opening therein; control means for the clutch including a member extending through said opening; a drive element on the driving shaft; a second drive element on the sleeve and disposed adjacent the first driving element; a power take-off shaft independent of the change-speed transmission; and coupling means shiftable selectively between the drive elements for driving the power take-off shaft from either of said elements.

4. For a vehicle including: a fly-wheel; an engine clutch having a driven clutch part; a change-speed transmission including a hollow shaft; and a driving shaft connecting the transmission and the aforesaid clutch part; a sleeve surrounding the aforesaid driving shaft; means directly connecting said sleeve to the fly-wheel, for rotation of said sleeve regardless of operation of the engine clutch; a drive element on the driving shaft; a second drive element on the sleeve and disposed adjacent the first driving element; a power take-off shaft extending through the hollow shaft of the change-speed transmission; and coupling means shiftable selectively between the drive elements for driving the power take-off shaft from either of said elements.

5. For a vehicle including: a fly-wheel; an engine clutch having a driven clutch part; a change-speed transmission including a hollow shaft; and a driving shaft connecting the transmission and the aforesaid clutch part; power transmission means comprising a sleeve surrounding the aforesaid driving shaft; means directly connecting said sleeve to the fly-wheel, for rotation of said sleeve regardless of operation of the engine clutch; a gear on the driving shaft; a gear on the sleeve closely spaced from the first gear; a power take-off shaft extending through the hollow shaft of the transmission; and a gear slidably keyed on the power take-off shaft for shifting into mesh with either of the aforesaid gears.

6. For a vehicle including: a fly-wheel; an engine clutch having a driven clutch part; a change-speed transmission including a hollow shaft; and a driving shaft connecting the transmission and the aforesaid clutch part; power transmission means comprising a sleeve surrounding the aforesaid driving shaft; means directly connecting said sleeve to the fly-wheel, for rotation of said sleeve regardless of operation of the engine clutch; a clutch member on the driving shaft; a second clutch member on the sleeve spaced from the first clutch member; a power take-off shaft extending through the hollow shaft of the transmission and including a gear; a gear in constant mesh with the power take-off shaft gear and mounted for shifting axially of the axis of the sleeve and driving shaft, and including clutch elements selectively engageable with either of the clutch members on the driving shaft or sleeve.

7. For a vehicle including: an engine clutch having a driving clutch part and a driven clutch part; a change-speed transmission; and a driving shaft connecting the transmission and the driven clutch part; a power take-off shaft paralleling the aforesaid driving shaft; means directly connecting said parallel power take-off shaft to the driving clutch part, for rotation of said shaft regardless of operation of the driven clutch part; a drive element on the driving shaft; a second drive element on the parallel power take-off shaft; coupling means for driving the power take-off shaft from either of said elements; a second power take-off shaft; and said coupling means capable of driving said second power take-off shaft from either of said elements.

8. For a vehicle including: an engine clutch having a driving clutch part and a driven clutch part; a change-speed transmission; and a driving shaft connecting the transmission and the driven clutch part; power transmission means comprising a shaft paralleling the aforesaid driving shaft; means directly connecting said parallel shaft to the driving clutch part, for rotation of said shaft regardless of operation of the driven clutch part; a drive element on the driving shaft; a second drive element on the other shaft; a power take-off shaft; coupling means for driving the power shaft from either of said elements; a second power take-off shaft transverse to the first power take-off shaft; and said coupling means optionally making driving connections to said second power take-off shaft from either of said elements.

9. For a vehicle including: a fly-wheel; an engine clutch having a driven clutch part; a change-speed transmission; and a driving shaft connecting the transmission and the aforesaid clutch part; power transmission means comprising a sleeve surrounding the aforesaid driving shaft; means for unitary attachment of said sleeve to said fly-wheel, whereby the sleeve has constant rotation with said fly-wheel; a power shaft independent of the change-speed transmission; and means for selectively driving said power shaft from either said declutchable driving shaft or said constantly rotating sleeve, whereby driving from the latter permits operation of the power shaft without operation of the transmission.

10. For a vehicle comprising an engine clutch, said engine clutch having a driving part and a driven part, a change-speed transmission, a driving shaft connecting the change-speed transmission and the engine clutch driven part, a power take-off shaft paralleling the aforesaid driving shaft, means for connecting said parallel power take-off shaft to the clutch driving part for rotation of said shaft independently of the clutch driven part, and means for connecting said driving shaft to said power take-off shaft for rotation of said shaft independently of said engine clutch driving part.

11. For a vehicle comprising an engine clutch, said engine clutch having a driving part and a driven part, a change-speed transmission, a driving shaft connecting the change-speed transmission and the engine clutch driven part, a power take-off shaft paralleling the aforesaid driving shaft, means connecting said parallel take-off shaft to the clutch driving part for rotation of said shaft independently of the clutch driven part, means connecting said driving shaft to said power take-off shaft for rotation of said shaft independently of said engine clutch driving part, and means for optionally engaging either of said means for driving said power take-off shaft.

12. For a vehicle comprising an engine clutch, said engine clutch having a driving part and a driven part, a change-speed transmission, a driving shaft connecting the change-speed transmission and the engine clutch driven part, a power take-off shaft paralleling the aforesaid driving shaft, means disconnectably connecting said parallel take-off shaft to the clutch driving part for rotation of said shaft independently of the clutch driven part, and means disconnectably connecting said driving shaft to said power take-off shaft for rotation of said shaft independently of said engine clutch driving part.

13. For a vehicle comprising an engine clutch, said engine clutch having a driving part and a driven part, a change-speed transmission, a driving shaft connecting the change-speed transmission and the engine clutch driven part, a power take-off shaft paralleling the aforesaid driving shaft, means disconnectably connecting said parallel take-off shaft to the clutch driving part for rotation of said shaft independently of the clutch driven part, means disconnectably connecting said driving shaft to said power take-off shaft for rotation of said shaft independently of said engine clutch driving part, and means for optionally engaging either of said means for driving said power take-off shaft.

14. For a vehicle including: an engine clutch having a driving clutch part and a driven clutch part; a change-speed transmission; and a driving shaft connecting the transmission and the driven clutch part; a power take-off shaft paralleling the aforesaid driving shaft; means for directly connecting said parallel power take-off shaft to the driving clutch part, for rotation of said shaft regardless of operation of the driven clutch part; a drive element on the driving shaft; said means for directly connecting said parallel power take-off shaft to the driving clutch part comprising a drive unit and means for shifting said drive unit to effect driving of the power take-off shaft from either the driving clutch part or the drive element on the driving shaft.

JOHN R. ORELIND.